(12) United States Patent
Cai et al.

(10) Patent No.: US 9,420,034 B2
(45) Date of Patent: Aug. 16, 2016

(54) PROVIDING SERVICES TO MULTIPLE TENANTS OF AN APPLICATION

(75) Inventors: Hong Cai, Beijing (CN); Jun Jie Cai, Beijing (CN); Wei Gong, Beijing (CN); Lin Quan Jiang, Shanghai (CN); Jing Lv, Shanghai (CN); Xin Sheng Mao, Beijing (CN); Heng Wang, Shanghai (CN); Hai Hong Xu, Shanghai (CN); Ke Zhang, Beijing (CN); Min Jun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1108 days.

(21) Appl. No.: 13/034,799

(22) Filed: Feb. 25, 2011

(65) Prior Publication Data

US 2011/0213870 A1    Sep. 1, 2011

(30) Foreign Application Priority Data

Feb. 26, 2010   (CN) .......................... 2010 1 0117727

(51) Int. Cl.
*G06F 15/173* (2006.01)
*H04L 29/08* (2006.01)

(52) U.S. Cl.
CPC ...................................... *H04L 67/10* (2013.01)

(58) Field of Classification Search
USPC ........................................................ 709/223
See application file for complete search history.

(56) References Cited

U.S. PATENT DOCUMENTS

| | | | |
|---|---|---|---|
| 6,023,721 A | 2/2000 | Cummings | |
| 6,714,962 B1 | 3/2004 | Helland et al. | |
| 7,305,577 B2 * | 12/2007 | Zhang | 714/6.11 |
| 7,503,031 B2 | 3/2009 | Chang et al. | |
| 7,917,607 B2 * | 3/2011 | Becker et al. | 709/222 |
| 7,949,684 B2 * | 5/2011 | Brooks et al. | 707/802 |
| 8,055,649 B2 * | 11/2011 | Dunagan et al. | 707/713 |
| 8,069,184 B2 * | 11/2011 | Becker et al. | 707/783 |
| 8,122,055 B2 * | 2/2012 | Grewal et al. | 707/784 |
| 8,131,580 B2 * | 3/2012 | Doshi et al. | 705/7.31 |
| 8,150,833 B1 * | 4/2012 | Scotton et al. | 707/713 |
| 8,271,641 B2 * | 9/2012 | Fry et al. | 709/224 |

(Continued)

FOREIGN PATENT DOCUMENTS

CN    102333115 A  *  1/2012

OTHER PUBLICATIONS

Wilding, M. M. et al. "Invariant Performance: A Statement of Task Isolation Useful for Embedded Application Integration," Dependable Computing for Critical Applications, Jan. 8, 1999, pp. 287-300.*

(Continued)

*Primary Examiner* — Melvin H Pollack
(74) *Attorney, Agent, or Firm* — Winstead, P.C.

(57) ABSTRACT

A method, system and computer program product for providing a service to multiple tenants of an application. Responsive to receiving from a client of a tenant a request, a tenant context of the tenant is bound to the request. With respect to an access to an isolation point of the application in the request, the access to the isolation point is redirected to a partition based on the tenant context bound to the request. The partition may be pre-established for the tenant with respect to the application. Hence, it is possible to provide a multi-tenant solution in a convenient, fast, and cost-effective way, and, in turn, to achieve resource sharing to a greater extent and enhance the resource efficiency.

24 Claims, 6 Drawing Sheets

(56) References Cited

U.S. PATENT DOCUMENTS

| | | | |
|---|---|---|---|
| 8,271,653 B2* | 9/2012 | Dehaan | 709/226 |
| 8,291,490 B1* | 10/2012 | Ahmed et al. | 726/17 |
| 2006/0235831 A1 | 10/2006 | Adinolfi et al. | |
| 2008/0086479 A1 | 4/2008 | Fry et al. | |
| 2008/0086482 A1 | 4/2008 | Weissman | |
| 2008/0270459 A1 | 10/2008 | Grewal et al. | |
| 2009/0049056 A1 | 2/2009 | Shutt et al. | |
| 2010/0005443 A1* | 1/2010 | Kwok et al. | 717/100 |
| 2010/0023937 A1* | 1/2010 | Kothari et al. | 717/170 |
| 2011/0040771 A1* | 2/2011 | Gilyadov et al. | 707/754 |
| 2011/0055378 A1* | 3/2011 | Ferris et al. | 709/224 |
| 2011/0106802 A1* | 5/2011 | Pinkney et al. | 707/737 |
| 2011/0107103 A1* | 5/2011 | Dehaan et al. | 713/171 |
| 2011/0138027 A1* | 6/2011 | Friedmann et al. | 709/223 |
| 2012/0191754 A1* | 7/2012 | Cecilia Torralba et al. | 707/770 |

OTHER PUBLICATIONS

Mok, A. K. et al. "Resource Partition for Real-Time Systems," Proceedings Seventh IEEE Real-Time Technology and Applications Symposium, 2001, pp. 75-84.*

Guo, Chang Jie et al. "A Framework for Native Multi-Tenancy Application Development and Management," The 9th International Conference on E-Commerce Technology and the 4th International Conference on Enterprise Computing, E-Commerce, and E-Services, Jul. 26, 2007, pp. 551-558.*

Greschler, D. and Mangan, T. (2002), Networking Lessons in Delivering 'Software as a Service'—Part II. Int. J. Network Mgmt., 12: 339-345. doi: 10.1002/nem.447.*

Ma, Dan. "The Business Model of 'Software as a Service,'" IEEE Intl Conference on Services Computing, Jul. 13, 2007, pp. 701-702.*

Turner, M. et al. "Turning Software into a Service," Computer, vol. 36, Issue 10, Oct. 2003, pp. 38-44.*

Boerger, Eileen, "SaaS Development Best Practices: From On-Premise to On-Demand," http://www.opsource.net/news/events/webinars/090722/agilis_webinar.pdf, Jul. 22, 2009.

Chong et al., "Architecture Strategies for Catching the Long Tail," http://msdn.microsoft.com/en-us/library/aa479069.aspx, Apr. 2006.

Gao et al., "Develop and Deploy Multi-Tenant Web-Delivered Solutions Using IBM Middleware: Part 3: Resource Sharing, Isolation and Customization in the Single Instance Multi-Tenant Application," http://www.ibm.com/developerworks/architecture/library/ws-multitentantsolutions/index.html, Mar. 11, 2009.

Fishteyn, Daniil, "Deploying Software as a Service (SaaS)," http://www.saas.com/homepage/pdf/SaaS.com_Whitepaper_Partl.pdf, 2008.

Guo et al., "Data Integration and Composite Business Services, Part 3, Building a Multi-Tenant Data Tier with Access Control and Security," http://domino.watson.ibm.com/library/cyberdig.nsf/papers/795198D0CCB58FF1852573A2005CFAD3/$File/rc24426.pdf, Nov. 2007.

* cited by examiner

PROVIDING SERVICES TO MULTIPLE TENANTS OF AN APPLICATION

CROSS-REFERENCE TO RELATED APPLICATIONS

This application claims priority under 35 U.S.C. §119(a) from Chinese Patent Application No. 201010117727.X, filed on Feb. 26, 2010, the contents of which are incorporated herein by reference.

TECHNICAL FIELD

The present invention relates to the field of data processing, and more specifically, to a method, apparatus, and related computer program product for handling a tenant client request of a multi-tenant application.

BACKGROUND

With the development of network technology, SaaS (Software as a Service) has become increasingly popular in the Internet field. SaaS is a mode for providing application software through the Internet, in which software providers deploy applications on a server uniformly and tenants may subscribe desired applications from software providers through the Internet according to their practical demands and obtain applications as provided by software providers through the Internet. Unlike a traditional (on-premise) mode in which software applications are purchased and installed on the customers' computers, in SaaS mode, tenants utilize functions of desired application software by using web-based applications as subscribed from software providers. For example, tenants may utilize the web-based application for customer relationship management, online sales, commodity inventory management, order tracking, and so on.

An advantage of SaaS is that tenants do not need to maintain the software but software providers are responsible for all work related to management and maintenance of the application. In this case, tenants who rent/utilize SaaS services do not need to purchase, construct, or maintain infrastructure related to traditional applications, and they do not need to have expertise in application software maintenance; they only need to have the ability to utilize the application software.

Compared with on-premise software technology, SaaS boasts a significant difference that the application employs a multi-tenant mode during operation. Multi-tenancy is a model of software architecture; under this model, only a single instance of the application runs on servers of SaaS providers, i.e., multiple tenants of the application need to share this single instance. Multi-tenancy is relative to single-tenancy. In a single-tenant architecture, one instance of the application only serves one tenant.

To further enhance the reuse of hardware and software resources, while pursing web-based services with more powerful functionality, application providers devote more and more attention to improving the resource efficiency and how to convert the traditional single-tenant applications into applications supporting multi-tenant and to ensure the multi-tenant applications achieve resource sharing as much as possible.

However, maximizing resource sharing in the process of providing services to multiple tenants is confronted with many difficulties. Although solutions for running multiple instances of the same application have been provided in the prior art, these solutions require multiple instances to be initiated for multiple tenants in runtime, so resources still cannot be shared sufficiently (i.e., there are redundant footprints of applications initiated for each tenant). In addition, these existing solutions are not transparent to the application providers and require modifications to the original application code which usually involves huge development effort.

BRIEF SUMMARY

In one embodiment of the present invention, a method for providing a service to multiple tenants of an application comprises binding a tenant context of a tenant to a request in response to receiving from a client the request associated with one of the multiple tenants. The method further comprises, with respect to an access to an isolation point of the application in the request, redirecting, by a processor, the access to the isolation point to a partition based on the tenant context bound to the request, where the partition is pre-established for the tenant with respect to the application.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing a service to multiple tenants of an application. In one embodiment, a request for a client of one of multiple clients is received, and a tenant context of this tenant is bound to the thread of this request. Access to an isolation point in the request is intercepted and is redirected to a partition pre-established for the tenant; or the tenant specific class, method or field is invoked. The embodiments of the present invention isolate application states, data and other remote resources, which should not be shared among multiple tenants. This is an approach of finer granularity with no need to modify the original application code. This approach reduces application development effort for SaaS enablement and shortens the time to market.

The flowcharts and blocks in the figures illustrate the system, methods, as well as architecture, functions and operations executable by a computer program product according to the embodiments of the present invention. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Figure 1:
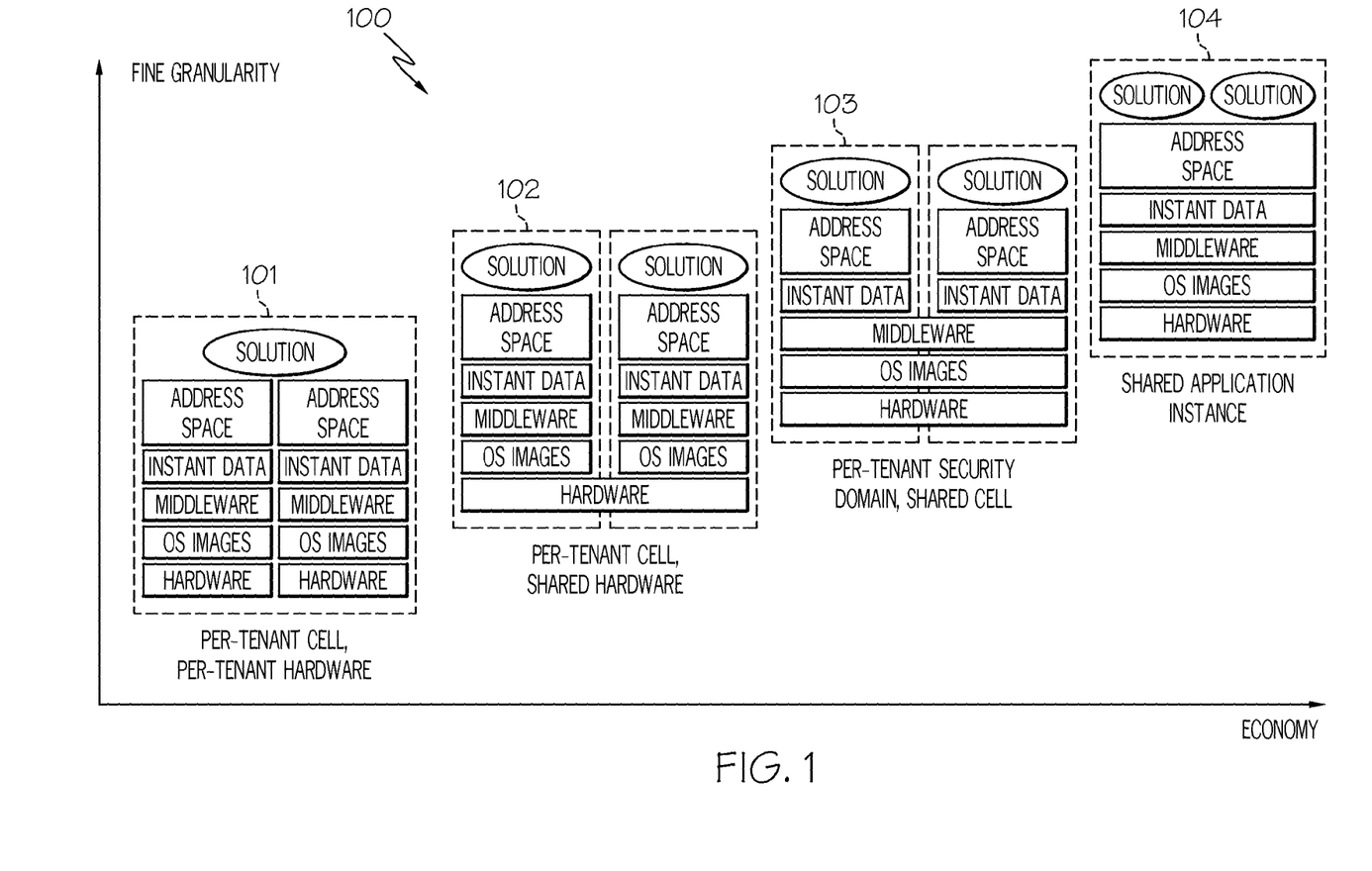
FIG. 1 schematically illustrates architectural views of various solutions for providing a service to multiple tenants of an application in accordance with an embodiment of the present invention.

Referring to the Figures, FIG. 1 schematically illustrates an architectural view 100 of various solutions for providing a service to multiple tenants of an application in accordance with an embodiment of the present invention. As illustrated in FIG. 1, a solution in the lower left corner, as shown in element 101, represents a circumstance in which a tenant cell requires a piece of tenant hardware. In the case of multiple tenants, each of them requires dedicated resources regarding underlying hardware, OS image, middleware, instance data and address space, and separately providing each tenant with a complete set of resources undoubtedly leads to low efficiency of some resources. Some solutions with gradually enhanced economy are illustrated from left to right along the horizontal axis (labeled "economy"). These solutions also gradually improve the granularity as illustrated from bottom to top along the vertical axis (labeled "fine granularity").

By deploying an application on multiple virtual machines, the hardware infrastructure may be shared as illustrated in element 102. By deploying the multi-application instances, the middleware is also shared as illustrated in element 103. The rightmost instance of application sharing by sharing the same single instance of an SaaS application among multiple tenants of the SaaS application, as shown in element 104, achieves full sharing of resources from hardware, OS, middleware, instant data and address space. Accordingly, it is the most economical approach.

In the multi-tenant architecture, since multiple tenants share one instance of application, some of the application artifacts, data and remote resources for each tenant can be shared and some cannot. For the sake of depiction, application artifacts, data and remote resources that cannot be shared among multiple tenants are referred to as isolated points. Regarding resource sharing, an application under multi-tenant architecture can save more resources and enhance the resource efficiency more than an application under the multi-instance architecture. Hence, application providers may significantly enhance the resource efficiency and increase economic benefits if they convert original single-tenant applications into multi-tenant applications.

In order to describe the embodiments of the present application more conveniently, terms that are involved in this specification are explained below.

Application: it refers to a software application as provided by an application provider for performing a specific function, and hereinafter generally refers to as a multi-tenant application, namely an application that supports multiple tenants with a single instance in runtime. For example, the "application" may be a web-based online storing application program (e.g., online stores like "web stores") through which ordinary tenants may set up their own "web stores" on the Internet. It should be noted although Java® is employed as a concrete technique for developing various applications in this specification, it is intended to be illustrative and not limiting, and other feasible techniques may be employed for developing applications. For example, the application in the embodiments may also be developed by using ".NET" or any other technique that is known or to be developed in the future.

Tenant: it refers to an organization, individual or other business entity, which uses/rents an application through the Internet. A tenant may rent an application provided by an application provider and use a function of the application through the Internet. For example, a person may rent a "web store" application as Tenant 1 to which the "web store" may be a "clothes store" selling clothes; a company may also rent the "web store" application as Tenant 2 to which the "web store" may be a "pets store" selling pets. At this point, this single "web store" application serves two customers, but the application may further serve more than two customers. These customers are generally referred to as "tenants" (i.e., business entities renting/using functions of applications) irrespective of their specific types (i.e., it is not concerned whether the tenant is an individual, a company or other organization). Although the applications "clothes store" and "pets store" as mentioned in examples of this specification are likely to be interpreted as two different traditional single-tenant applications, it should be noted that the "application" mentioned in this specification refers to a multi-tenant application. "Clothes store" and "pets store" are not two different single-tenant applications but are representations for two different tenants of the multi-tenant application "web store." The "clothes store" and "pets store" may each have its own name for the store and have different number of visits and sell different commodities; in essence, however, they have the same application program framework and may have their own private data while sharing part of the data.

Client: it refers to a client (e.g., a web browser on a client side device or laptop) of a user that accesses a multi-tenant application through a network. In the case of the foregoing "web store" application, the clients may include a client of User 1 who is visiting the "clothes store" of Tenant 1 and a client of User 2 who is visiting the "pets store" of Tenant 2. It should be noted that the application and tenants may be in a one-to-many relationship. That is, in multi-tenant applications, one application is leased to multiple tenants. The "web store" application may be exhibited as a "food store," "book store" and others while being leased to other tenants. A multi-tenant application that is leased to specific tenants may be accessed by one or more clients. For example, while User 1 is accessing the "clothes store" of Tenant 1, the "pets store" of Tenant 2 may be accessed by multiple users, such as Users 2, 3, 4.

Tenant context: it refers to an object such as an identifier describing a specific tenant associated with a request when an application is being visited. An entity sending a request may have several forms, such as a client, a lifecycle callback, an event, a message, etc. The tenant context does not relate to the entity sending a request but is associated with an attribute of the request, i.e., a tenant to which the accessing request belongs. The tenant context is usually indicated by a unique tenant identifier. For example, Request 1 from User 1 is visiting the "clothes store" of Tenant 1, at which point Request 1 is affiliated to Tenant 1; hence the tenant context of Request 1 is the tenant identifier of Tenant 1 (e.g., tenant_1). Request 2 from User 2 is visiting the "pets store" of Tenant 2; since Request 2 is affiliated to Tenant 2, the tenant context of Request 2 is the tenant identifier of Tenant 2 (e.g., tenant_2). In other words, the tenant context indicates, in the form of an identifier, a tenant with which an application being accessed by a request is associated.

According to the embodiments of the present invention, data of a multi-tenant application may include various types of artifacts, such as an application scope object, and other data related to data processed by the multi-tenant application. Regarding the foregoing "web store" application, isolation points of the multi-tenant application may comprise, for example, a welcome sign, a name of the store, the number of visits, a name of a commodity, the amount of the commodity, etc., or may comprise, for example, a page layout and a background color of the "web store" application. As required by the customers (tenants), these application isolation points all need to be isolated and customized for each tenant.

Since multiple tenants share one identical instance in a multi-tenant application, data of the application may be virtualized, and the instance may be designed as a virtual application instance customized for each tenant. When a request from a client accesses the multi-tenant application, this request actually accesses the virtual data. From the perspective of each request, data being accessed is completely specific to a tenant associated with the request. An actual location of the data accessed by a request depends on the tenant with which the application being accessed is associated.

Isolation point: it refers to data that cannot be shared among multiple tenants in an application, which is data associated with specific tenants in a multi-tenant application. For example, the "web store" application comprises "welcome signs," but the "welcome signs" for the "clothes store" of Tenant 1 and the "pets store" of Tenant 2 may be customized by the tenants themselves. When User 1 and User 2 visit the "clothes store" and the "pets store" respectively, although they share the same instance, contents being accessed differ from each other. For example, User 1 may see "welcome to xx clothes store," and User 2 may see "welcome to xx pets store." Specific examples of isolation points may further comprise, for example, a name of the store, the number of visits, a name of a commodity, the amount of the commodity, etc. It should be noted that a typical example of isolation points is schematically illustrated here, but isolation points may further comprise other kinds of data, including, but not limited to, Servlet context attributes, states such as Servlet initial parameters, container management configurations, singleton objects, and static data involved in programming.

Partition: it refers to space storing isolation points for tenants in the runtime of an application server, a database server or other servers serving remote resources. Partitions correspond to specific tenants, and each tenant in a multi-tenant application has its own partition for storing private data that cannot be shared by other tenants. For example, partitions for Tenant 1 and Tenant 2 may store isolation point data, such as a welcome sign, a name of the store, the number of visits, a name of a commodity, the amount of the commodity (as shown in Table 1 and Table 2), etc. It should be noted that partitions mentioned herein may be logical partitions implemented as any data structures.

TABLE 1

Partition 1 for Tenant 1

| Name of Data | Content |
|---|---|
| Welcome Sign | Welcome to xx Clothes Store |
| Name of Store | xx Clothes Store |
| Number of Visits | 100 |
| ... | ... |

TABLE 2

Partition 2 for Tenant 2

| Name of Data | Content |
|---|---|
| Welcome Sign | Welcome to xx Pets Store |
| Name of Store | xx Pets Store |
| Number of Visits | 200 |
| ... | ... |

Tenant-partition map: it refers to a relational map from each tenant to its corresponding group with respect to a multi-tenant application. In runtime, a partition may have an address, so the tenant-partition map may be a mapping relationship between a leased identifier and the partition's address. It should be pointed out especially that the "server" mentioned in this specification refers to a server device rented by an application provider from a network provider. The application provider deploys a multi-tenant application on the server device for use by tenants. The application provider or the third party may develop methods and apparatuses according to the embodiments of the present invention and deploy a computer program product, which can implement the methods and apparatuses, on the server device of the network provider so as to implement the methods and apparatuses according to the present invention.

Figure 2:
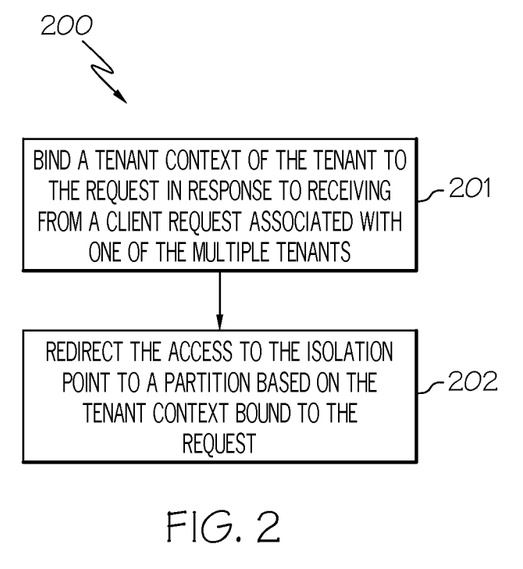
FIG. 2 is a flowchart of a method for providing a service to multiple tenants of an application according to an embodiment of the present invention.

Referring to FIG. 2, detailed description is now presented to a concrete implementation according to an embodiment of the present invention. FIG. 2 is a flowchart of a method 200 for providing a service to multiple tenants of an application according to an embodiment of the present invention. In step 201, responsive to a request associated with one of multiple tenants from a client, a tenant context of the tenant is bound to the request. For each received client request, a tenant associated with this specific client request is first parsed in this step. For example, tenant information may be obtained by parsing a host name or a parameter in the Uniform Resource Locator (URL) of the request, and a tenant context is thereafter constructed.

In a certain embodiment, a multi-tenant application may be deployed on a certain physical host, and different host names are allocated to the tenant. For example, an application provider may deploy a "web store" on a server of a network provider and set a host name of "clothesstore.ecom.com" for the "clothes store" of Tenant 1 and a host name of "petsstore.ecom.com" for the "pets store" of Tenant 2. The tenant associated with the request may be obtained by analyzing the host name being accessed by the user. If User 1 is accessing "clothesstore.ecom.com," it is possible to determine by parsing that the tenant context is Tenant 1, e.g., represented by the tenant identifier "tenant_1." It is to be understood that the foregoing host names are merely illustrative, and those skilled in the art may employ other implementations, such as providing different paths, using different input parameters, or directly login using tenant ID as a parameter, etc.

In step 202, access to isolation points in the request is redirected to a partition based on the tenant context bound to the request, where the partition is pre-established for a tenant with respect to the application.

The tenant identifier needs to be delivered in the whole procedure of processing the request. For example, in a certain embodiment, when a request for a tenant is received from a client, access to isolation points in the request is redirected to a partition established for the tenant. That is, for different accesses to different tenants from a client, shared data as involved in the access may not be differentiated, and all requests point to the same shared storage space; for isolation points involved in the access, access to the isolation points is redirected to respective partitions of tenants when processing requests from different tenants.

In the case of the foregoing example, Request 1 from User 1 is accessing the "clothes store," and the tenant context of Request 1 is "tenant_1"; Request 2 from user 2 is accessing the "pets store," and the tenant context of Request 2 is "tenant_2." When logging into the welcome page, although the "clothes store" and the "pets store" correspond to the same instance, because the "welcome sign" belongs to the isolation point data, reads of "welcome sign" data are redirected to respective partitions during the processing of Request 1 and Request 2, i.e., they are redirected to the "welcome signs" in Partition 1 and Partition 2 (as shown in Table 1 and Table 2) corresponding to the tenant context "tenant_1" and "tenant_2," respectively.

Step 202 may further comprise intercepting access to the isolation points in the request. Since the isolation points may be set at different levels, different means may be employed for intercepting the isolation points. For example, access to global objects, object fields, literals and so on may be intercepted by the code instrumentation at the Java Virtual Machine (JVM) level; access to container management, such as JavaServer Pages (JSP), a Servlet, Enterprise JavaBeans (EJB) and so on may be intercepted by a wrapper at the container level. Here, the Java™ language is used as an example for illustrating an embodiment of virtualizing data, but those skilled in the art may employ other means according to other programming techniques.

Figure 3:
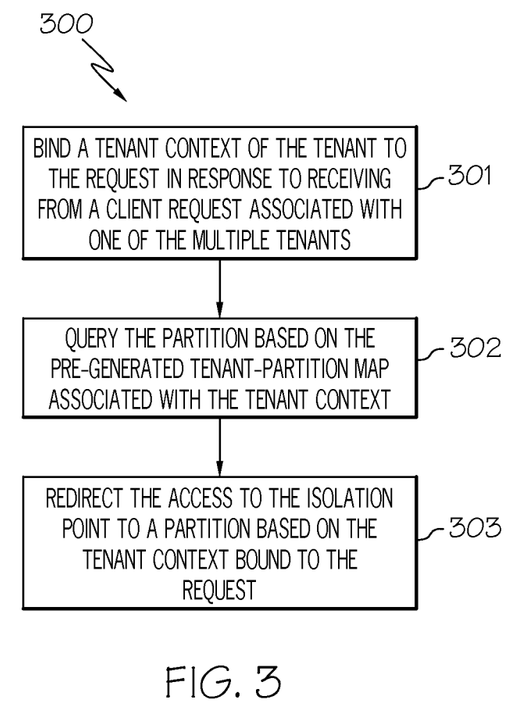
FIG. 3 is a flowchart of a method for providing a service to multiple tenants of an application according to another embodiment of the present invention.

Another embodiment is described below with reference to FIG. 3. FIG. 3 is a flowchart of a method 300 for providing a service to multiple tenants of an application according to another embodiment of the present invention. Step 301 in FIG. 3 is identical or similar to step 201 in FIG. 2 and step 303 is identical or similar to step 202 in FIG. 2. In step 302, a partition is queried based on a pre-generated tenant-partition map associated with a tenant context. In a certain embodiment, the tenant-partition map stores the correspondence relationship between a tenant and a partition for the tenant. For example, the correspondence relationship may be saved in the form of tenant identifiers and partition addresses, just as shown in Table 3.

TABLE 3

Tenant-Partition Map

| Tenant (Represented by Tenant Identifier) | Partition (Represented by Storage Address) |
|---|---|
| tenant_1 | AAAA |
| tenant_2 | BBBB |

According to the embodiment illustrated in FIG. 3, access to the isolation points may be rapidly redirected to corresponding partitions by the tenant-partition map based on the tenant contexts (i.e., tenant identifiers) bound to the request. For example, when processing a request for access to the "clothes store," it is clear that the request corresponds to Tenant 1. When an isolation point is being accessed in the procedure, the corresponding partition address "AAAA" is found from the tenant-partition map by the tenant identifier "tenant_1" of Tenant 1, and then access to the isolation points is redirected in the partition address according to the isolation point name.

Figure 4:
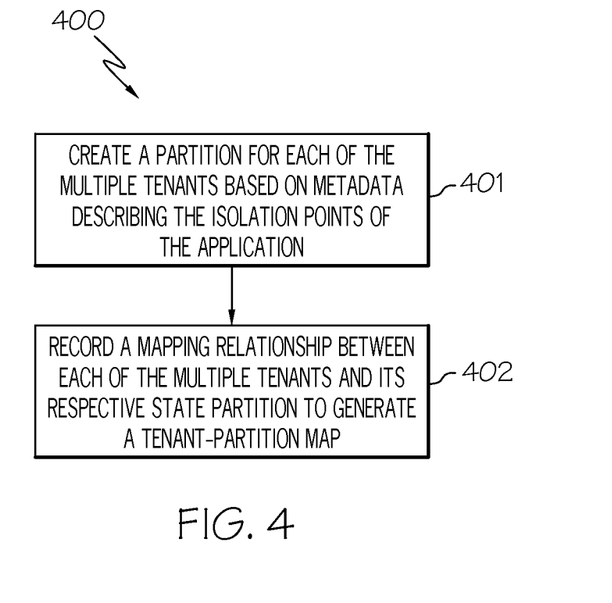
FIG. 4 is a flowchart of a method for pre-generating a tenant-partition map according to an embodiment of the present invention.

FIG. 4 is a flowchart of a method 400 for pre-generating a tenant-partition map according to an embodiment of the present invention. In a certain embodiment, a tenant-partition map used in the embodiment as illustrated in FIG. 3 may be pre-generated using the process illustrated in FIG. 4. As is clear from the foregoing definition, the tenant-partition map records correspondence relationships between the tenants and partitions.

As illustrated in FIG. 4, in step 401, a partition is created for each of multiple tenants based on metadata describing the isolation points of the application. One of the purposes of step 401 is to enable each tenant to have its own partition. The following circumstances may occur: multiple tenants may simultaneously go online when the application is initiated initially; or new tenants may participate after the application runs for a period of time. In the case of the latter, a partition is created for the newly added tenant having no partition. After the partition is created, data in the partition is initialized immediately based on the metadata describing the isolation points of the application. Data may be initialized when the partition is accessed for the first time.

In step 402, a mapping relationship between each of the multiple tenants and its own partition is recorded to generate a tenant-partition map.

Referring to the foregoing example, the application provider first leases the "web store" application to Tenant 1 and to Tenant 2. When Tenant 1 and Tenant 2 go online, Partition 1 and Partition 2 may be created based on metadata, and a tenant-partition map is generated (as shown in Table 3). After running for a period of time, the application provider leases the "web store" to Tenant 3, at which point a partition is created for the newly added Tenant 3 and corresponding information is added to the tenant-partition map. The tenant-partition map is then as illustrated in Table 4. Content of the tenant-partition map varies as the tenants are added or removed.

TABLE 4

Tenant-Partition Map After Adding New Tenant

| Tenant (Represented by Tenant Identifier) | Partition (Represented by Storage Address) |
|---|---|
| tenant_1 | AAAA |
| tenant_2 | BBBB |
| tenant_3 | CCCC |

Figure 5:
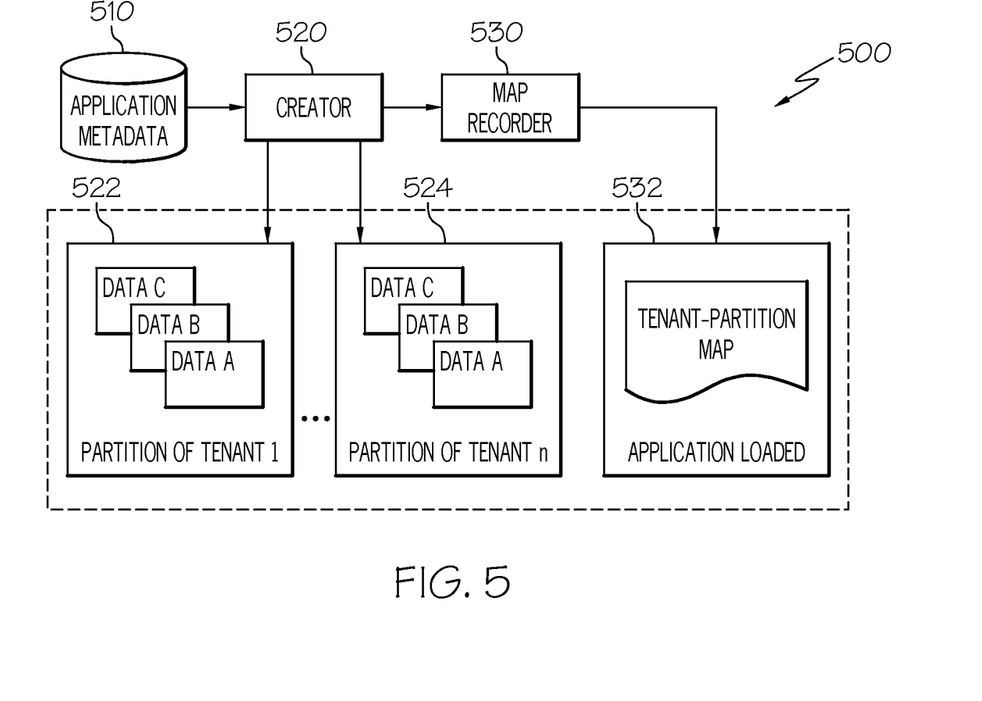
FIG. 5 schematically illustrates a structural view of an apparatus for pre-generating a tenant-partition map according to an embodiment of the present invention.

FIG. 5 schematically illustrates a structural view of an apparatus 500 for pre-generating a tenant-partition map according to an embodiment of the present invention. As illustrated in FIG. 5, apparatus 500 may comprise a creator 520 and a map recorder 530. Creator 520 is for creating a partition for each tenant based on application metadata 510 describing which data in a multi-tenant application should be isolated. Application metadata 510 may have various expressions so long as they can describe isolation points to be isolated. Hence, creator 520 creates a partition for each tenant based on information on isolation points as recorded in application metadata 510. For example, the isolation points for the "web store" application may comprise a welcome sign, a name of the store, the number of visits, etc. At this point, creator 520 may create a partition for each tenant by using these isolation points as names of data in the partition. For example, Table 1 and Table 2, shown above, illustrate respective partitions for Tenant 1 and Tenant 2. It should be noted that the content of data in the partition may vary with access to the application (for example, the number of visits may increase every time) or be set by tenants (e.g., modifying a welcome sign, a name of the store, etc.). When a new tenant goes online, creator 520 may create a partition for this newly added tenant. Block 522 and 524 in FIG. 5 illustrate respective partitions for Tenant 1 and Tenant n.

Map recorder 530 is for recording a mapping relationship between each tenant and its respective state partition and generating a tenant-partition map 532. It should be noted that it is possible to enable multiple tenants to share an original single-tenant application but own their own instance of isolation points without rewriting application code according to the embodiments of the present invention. A significant aspect for achieving this solution is to redirect access to the isolation points in a request to partitions for tenants associated with the request. Hence, to analyze which data in the application are isolation points is an important step.

Figure 6:
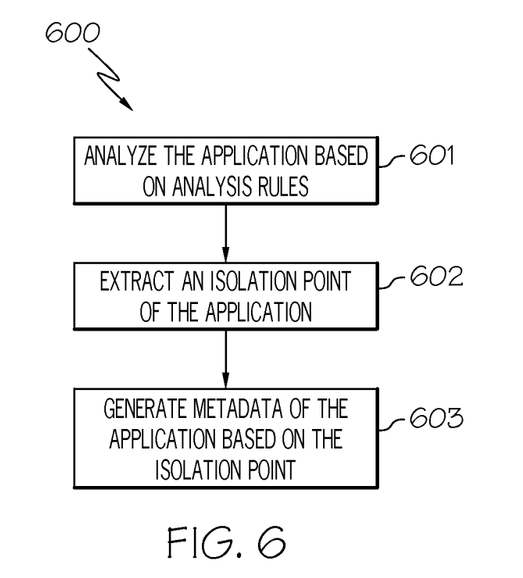
FIG. 6 is a flowchart of a method for extracting an application isolation point and obtaining metadata according to an embodiment of the present invention respectively.

FIG. 6 is a flowchart of a method 600 for extracting application isolation points and obtaining metadata according to an embodiment of the present invention. In step 601, the application is analyzed based on analysis rules. The analysis rules specify which data might be isolation points, and specify types of data specific to tenants, such as Servlet context attributes, states, such as Servlet initial parameters, container management configurations, singleton objects, and static data involved in programming. Subsequently, in step 602, isolation points of the application are extracted. In step 603, metadata of the application is generated based on the isolation points. It should be noted that in a certain embodiment, generating metadata may further comprise the step of filtering isolation points that are irrelevant to the multi-tenancy providing solution. It is to be understood that the fewer isolation points, the more data which can be shared among multiple tenants, and the fewer requests which need to be redirected. Hence, it is possible to increase the efficiency of the multi-tenant solution by filtering irrelevant data.

Figure 7:
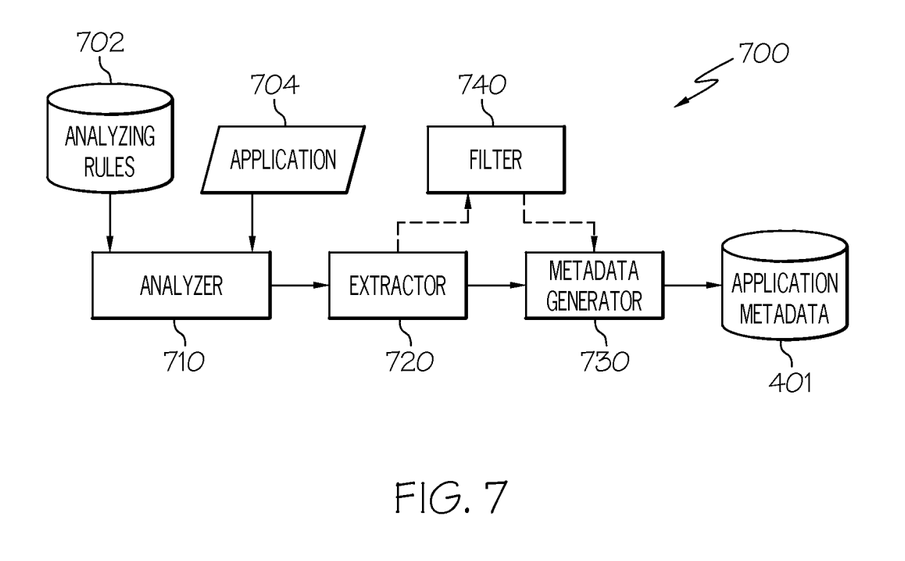
FIG. 7 schematically illustrates a structural view of an apparatus for extracting an application isolation point and obtaining metadata according to an embodiment of the present invention.

FIG. 7 schematically illustrates a structural view of an apparatus 700 for extracting application isolation points and obtaining metadata according to an embodiment of the present invention. According to one embodiment, apparatus 700 for obtaining metadata comprises an analyzer 710, an extractor 720, and a metadata generator 730. Analyzer 710 reads analysis rules 702 and an application 704 and analyzes application 704 based on analysis rules 702. Extractor 720 extracts isolation points of the application and metadata generator 730 describes information on the isolation points in a specific format and generates application metadata 401. In some embodiments, a filter 740 may be further included for filtering isolation points which are irrelevant to the multi-tenancy providing solution. It should be noted that it is possible to perform a metadata generating procedure only once for one application. This procedure may be independent of the above-described runtime procedure, i.e., independent of redirecting a request to an isolation point to a partition of a relevant tenant. For example, generating metadata may be implemented when the development of the application is completed or when the application is desired to support multiple tenants.

Figure 8:
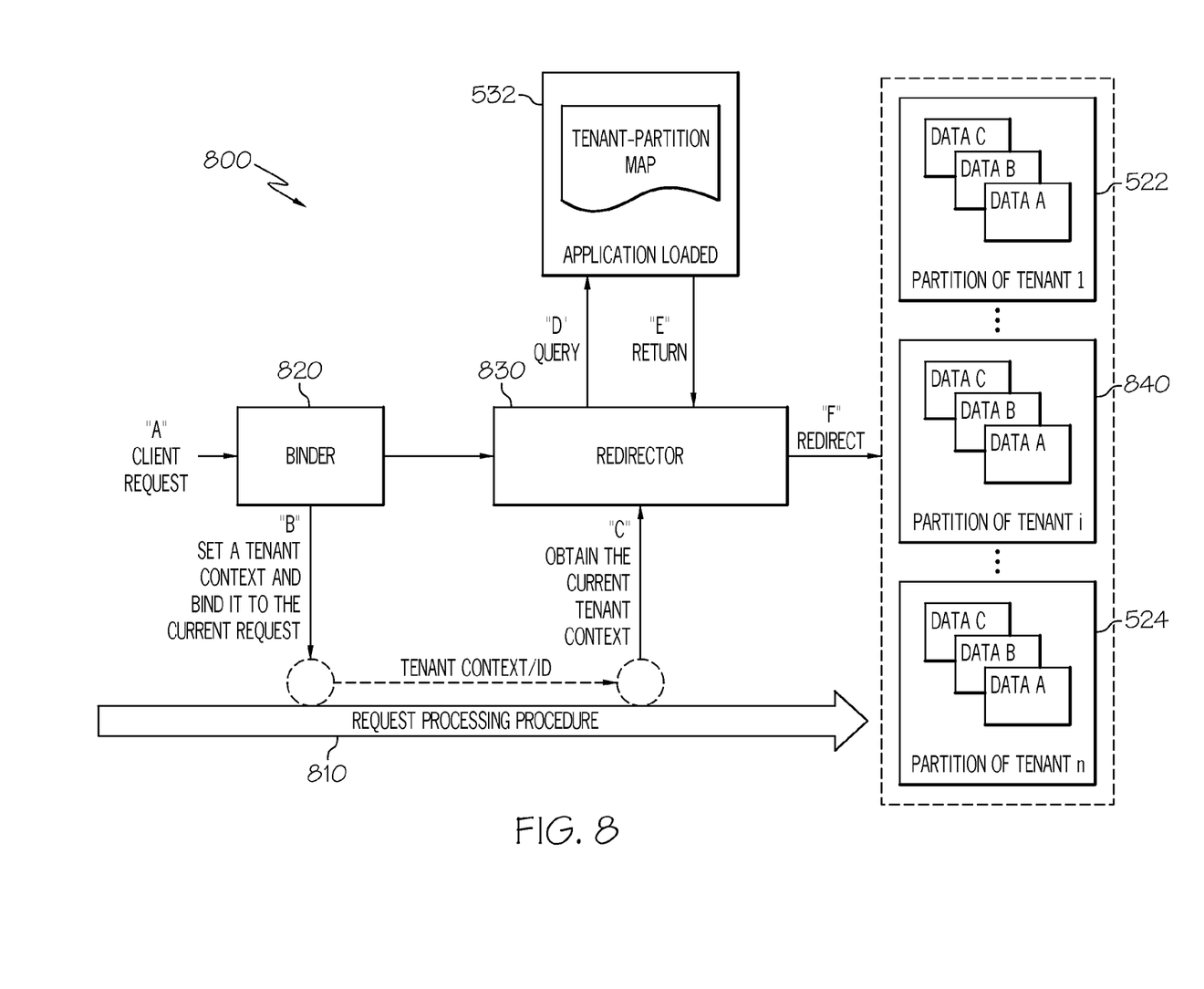
FIG. 8 schematically illustrates a structural view of an apparatus for providing a service to multiple tenants of an application according to an embodiment of the present invention.

FIG. 8 schematically illustrates a structural view of an apparatus 800 for providing a service to multiple tenants of an application according to an embodiment of the present invention. As illustrated in FIG. 8, apparatus 800 for providing a service to multiple tenants of an application comprises a binder 820, responsive to receiving from a client a request associated with one of multiple tenants, for binding the requested tenant context to the request. Apparatus 800 further comprises a redirector 830 for redirecting access to an isolation point in the request to a partition based on the tenant context bound to the request. As described above, the partition here is pre-established for a tenant with respect to the application.

Referring to FIG. 8, more detailed description is presented to the operating principle of apparatus 800 for providing a service to multiple tenants. An arrow schematically illustrates a processing procedure 810 of a request from left to right at the bottom of FIG. 8; the direction of the arrows represents a time sequence. First, binder 820 receives a request from a client (as shown by arrow A) and parses a tenant associated with the client request. For example, it is possible to determine that the client request is associated with tenant i by parsing a host name or other means as described above. Then, a tenant context is set and represented by a tenant identifier tenant_i.

The tenant context is propagated throughout the request processing procedure 810. When an isolation point is being accessed in the request processing procedure, redirector 830 intercepts the access to the isolation point. Afterwards, redirector 830 obtains the current tenant context tenant_i (as shown by arrow C) and queries a tenant-partition map 532 in the direction shown by arrow D. A query result is returned to redirector 830 in the direction shown by arrow E. Subsequently, redirector 830 redirects the isolation point request to a corresponding partition based on the query result as shown by arrow F. For example, in the case that the tenant context is tenant_i, the isolation point request is redirected to a partition 840 of tenant i. It should be noted that one request processing procedure may have multiple occurrences of access to one identical isolation point or more different isolation points. FIG. 8 illustrates one illustrative request.

According to an embodiment of the present invention, when the request processing procedure employs threads, ThreadLocal or a similar mechanism, programming techniques may be used to achieve the tenant context binding and propagation so as to attach a tenant context corresponding to a request to the current request. According to other embodiments of the present invention, the request processing procedure may be further implemented by multiple threads, processes, or other means. In this case, other programming methods of delivering parameters between processes and/or threads may be used.

It is to be understood that FIG. 8 illustrates a runtime operation of apparatus 800 according to the embodiments of the present invention. Although each component of apparatus 800 is physically deployed on a network server provided by a network provider, a provider party of apparatus 800 may be a provider of the initial application or any other organization, individual or entity who wishes the initial single-tenant application to support multi-tenancy. Apparatus 800 is provided in the form of a computer program product and can perform functions of the apparatus as illustrated in FIG. 8 when deployed on a network server.

When implementing the method for providing a service to multiple tenants of an application, the application provider or the third party development entity capable of implementing the methods according to the embodiments of the present invention deploys a computer program product, which can support providing a service to multiple tenants of an application, on the server device of the network provider, thereby forming an apparatus which can support providing a service to multiple tenants of an application. In some embodiments, the apparatus illustrated in FIG. 8 is formed by combining a computer software product with server hardware. It should be noted that an entity implementing the methods and apparatuses according to the present invention may be the above-mentioned application provider, third party development entity, or a network provider providing a hardware server and a network connection server. It is also possible that the network provider does not implement the methods and apparatuses according to the present invention but simply provide a hardware platform and relevant network services implementing the methods and apparatuses of the present invention.

Figure 9:
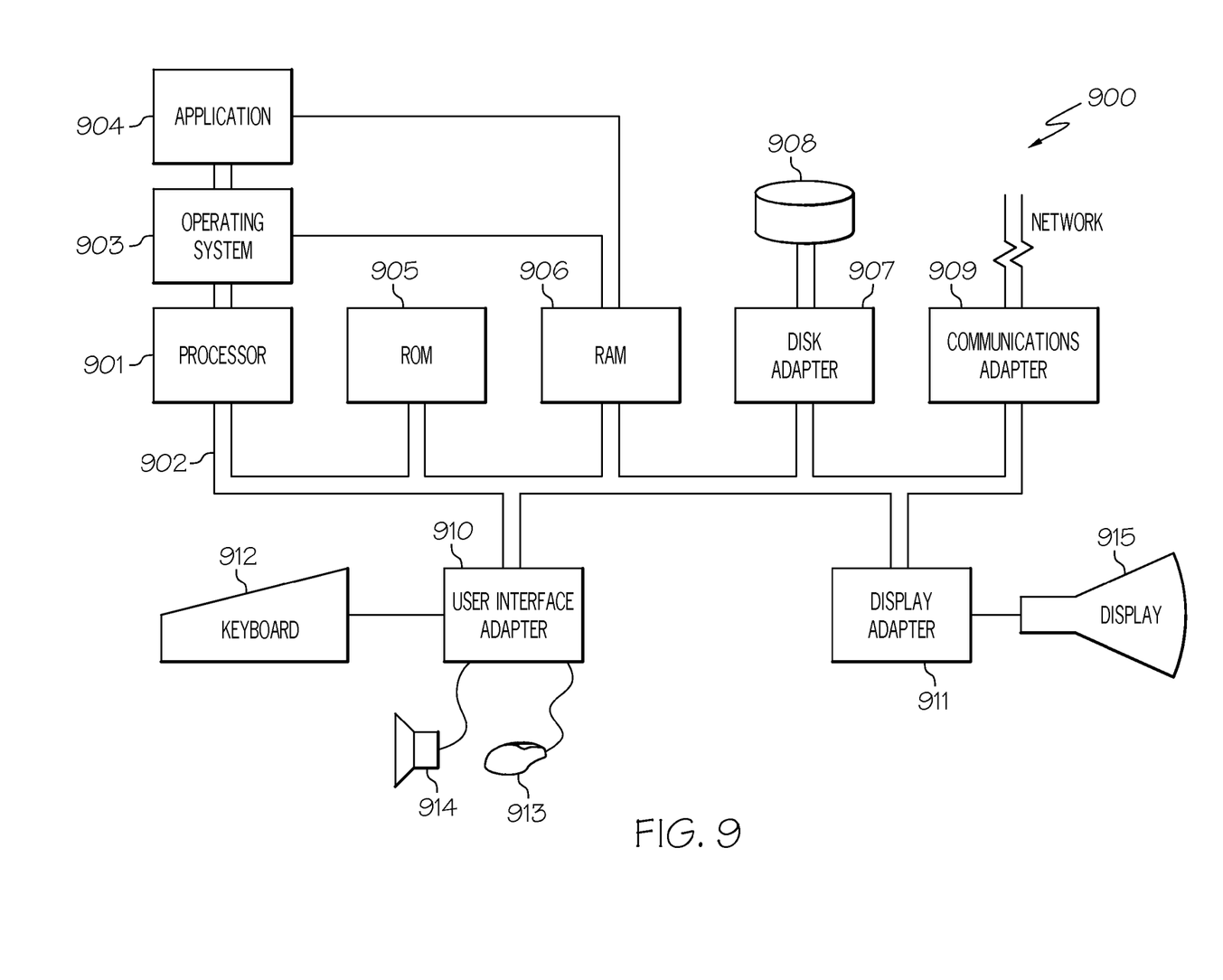
FIG. 9 illustrates a hardware environment for a computer system for practicing the principles of the present invention in accordance with an embodiment of the present invention.

FIG. 9 depicts an embodiment of a hardware configuration of a computer system 900 which is representative of a hardware environment for practicing the present invention. Referring to FIG. 9, computer system 900 has a processor 901 coupled to various other components by system bus 902. An operating system 903 may run on processor 901 and provide control and coordinate the functions of the various components of FIG. 9. An application 904 in accordance with the principles of the present invention may run in conjunction with operating system 903 and provide calls to operating system 903 where the calls implement the various functions or services to be performed by application 904. Application 904 may include, for example, an application for providing services to multiple tenants of an application as discussed above.

Referring again to FIG. 9, read-only memory ("ROM") 905 may be coupled to system bus 902 and include a basic input/output system ("BIOS") that controls certain basic functions of computer device 900. Random access memory ("RAM") 906 and disk adapter 907 may also be coupled to system bus 902. It should be noted that software components including operating system 903 and application 904 may be loaded into RAM 906, which may be computer system's 900 main memory for execution. Disk adapter 907 may be an integrated drive electronics ("IDE") adapter that communicates with a disk unit 908, e.g., disk drive.

Computer system 900 may further include a communications adapter 909 coupled to bus 902. Communications adapter 909 may interconnect bus 902 with an outside network (not shown) thereby allowing computer system 900 to communicate with other similar devices.

I/O devices may also be connected to computer system 900 via a user interface adapter 910 and a display adapter 911. Keyboard 912, mouse 913 and speaker 914 may all be interconnected to bus 902 through user interface adapter 910. Data may be inputted to computer system 900 through any of these devices. A display monitor 915 may be connected to system bus 902 by display adapter 911. In this manner, a user is capable of inputting to computer system 900 through keyboard 912 or mouse 913 and receiving output from computer system 900 via display 915 or speaker 914.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

The invention claimed is:

1. A method for providing a service to multiple tenants of an application, the method comprising:
    binding a tenant context of a tenant to a request in response to receiving from a client the request associated with one of the multiple tenants; and
    with respect to an access to an isolation point of the application in the request, redirecting, by a processor, the access to the isolation point to a partition based on the tenant context bound to the request, wherein the partition is pre-established for the tenant with respect to the application.

2. The method according to claim 1, wherein the redirecting access to the isolation point in the request to the partition based on the tenant context bound to the request further comprises:
    querying the partition based on a pre-generated tenant-partition map associated with the tenant context.

3. The method according to claim 2, further comprising:
    creating a respective partition for each of the multiple tenants based on metadata describing the isolation point of the application; and
    recording a mapping relationship between each of the multiple tenants and its respective partition to generate the tenant-partition map.

4. The method according to claim 3, further comprising:
    analyzing the application based on analysis rules;
    extracting the isolation point of the application; and
    generating the metadata based on the isolation point.

5. The method according to claim 4, further comprising:
    filtering isolation points that are irrelevant to providing a multi-tenant solution to the application.

6. The method according to claim 1, wherein the isolation point comprises data that cannot be shared among the multiple tenants of the application.

7. The method according to claim 1, wherein data associated with the isolation point is stored in the partition.

8. The method according to claim 1, wherein the tenant context is identified by a unique tenant identifier.

9. A computer program product embodied in a computer readable storage medium for providing a service to multiple tenants of an application, the computer program product comprising the programming instructions for:
    binding a tenant context of a tenant to a request in response to receiving from a client the request associated with one of the multiple tenants; and
    with respect to an access to an isolation point of the application in the request, redirecting the access to the isolation point to a partition based on the tenant context bound to the request, wherein the partition is pre-established for the tenant with respect to the application.

10. The computer program product according to claim 9, wherein the programming instructions for redirecting access to the isolation point in the request to the partition based on the tenant context bound to the request comprises the programming instructions for:
    querying the partition based on a pre-generated tenant-partition map associated with the tenant context.

11. The computer program product according to claim 10 further comprising the programming instructions for:
    creating a respective partition for each of the multiple tenants based on metadata describing the isolation point of the application; and
    recording a mapping relationship between each of the multiple tenants and its respective partition to generate the tenant-partition map.

12. The computer program product according to claim 11 further comprising the programming instructions for:
    analyzing the application based on analysis rules;
    extracting the isolation point of the application; and
    generating the metadata based on the isolation point.

13. The computer program product according to claim 12 further comprising the programming instructions for:
    filtering isolation points that are irrelevant to providing a multi-tenant solution to the application.

14. The computer program product according to claim 9, wherein the isolation point comprises data that cannot be shared among the multiple tenants of the application.

15. The computer program product according to claim 9, wherein data associated with the isolation point is stored in the partition.

16. The computer program product according to claim 9, wherein the tenant context is identified by a unique tenant identifier.

17. A system, comprising:
    a memory unit for storing a computer program for providing a service to multiple tenants of an application; and
    a processor coupled to said memory unit, wherein said processor, responsive to said computer program, comprises:
        circuitry for binding a tenant context of a tenant to a request in response to receiving from a client the request associated with one of the multiple tenants; and
        with respect to an access to an isolation point of the application in the request, circuitry for redirecting the access to the isolation point to a partition based on the tenant context bound to the request, wherein the partition is pre-established for the tenant with respect to the application.

18. The system according to claim 17, wherein the circuitry for redirecting access to the isolation point in the request to the partition based on the tenant context bound to the request comprises:

circuitry for querying the partition based on a pre-generated tenant-partition map associated with the tenant context.

19. The system according to claim 18, wherein said processor further comprises:
    circuitry for creating a respective partition for each of the multiple tenants based on metadata describing the isolation point of the application; and
    circuitry for recording a mapping relationship between each of the multiple tenants and its respective partition to generate the tenant-partition map.

20. The system according to claim 19, wherein said processor further comprises:
    circuitry for analyzing the application based on analysis rules;
    circuitry for extracting the isolation point of the application; and
    circuitry for generating the metadata based on the isolation point.

21. The system according to claim 20, wherein said processor further comprises:
    circuitry for filtering isolation points that are irrelevant to providing a multi-tenant solution to the application.

22. The system according to claim 17, wherein the isolation point comprises data that cannot be shared among the multiple tenants of the application.

23. The system according to claim 17, wherein data associated with the isolation point is stored in the partition.

24. The system according to claim 17, wherein the tenant context is identified by a unique tenant identifier.

* * * * *